(12) United States Patent
Asano

(10) Patent No.: US 11,739,523 B2
(45) Date of Patent: *Aug. 29, 2023

(54) MULTI-LAYERED REINFORCED WOOD MATERIAL

(71) Applicant: MORIWATAKARA CO., LTD., Sakai (JP)

(72) Inventor: Nariaki Asano, Tokyo (JP)

(73) Assignee: MORIWATAKARA CO., LTD., Sakai (JP)

( * ) Notice: Subject to any disclaimer, the term of this patent is extended or adjusted under 35 U.S.C. 154(b) by 253 days.

This patent is subject to a terminal disclaimer.

(21) Appl. No.: 16/755,668

(22) PCT Filed: Oct. 12, 2018

(86) PCT No.: PCT/JP2018/038182
§ 371 (c)(1),
(2) Date: Apr. 13, 2020

(87) PCT Pub. No.: WO2019/074113
PCT Pub. Date: Apr. 18, 2019

(65) Prior Publication Data
US 2021/0040730 A1    Feb. 11, 2021

(30) Foreign Application Priority Data

Oct. 13, 2017   (JP) ................................ 2017-199939

(51) Int. Cl.
*E04B 1/94* (2006.01)
*E04C 3/14* (2006.01)
(Continued)

(52) U.S. Cl.
CPC .............. *E04B 1/944* (2013.01); *B32B 21/08* (2013.01); *B32B 21/10* (2013.01); *E04C 3/14* (2013.01);
(Continued)

(58) Field of Classification Search
CPC ... B32B 21/10; B32B 21/08; B32B 2260/021; B32B 2307/3065; B32B 2419/00;
(Continued)

(56) References Cited

U.S. PATENT DOCUMENTS 11,193,270 B2 * 12/2021 Asano ................ E04B 1/944

FOREIGN PATENT DOCUMENTS

JP          2005-36456 A      2/2005
JP          4065416 B2         3/2008
(Continued)

OTHER PUBLICATIONS

Translation of JP2016030896. (Year: 2016).*
(Continued)

*Primary Examiner* — Catherine A. Simone
(74) *Attorney, Agent, or Firm* — Muncy, Geissler, Olds & Lowe, P.C.

(57) ABSTRACT

Provided is a multi-layered reinforced wood material which is excellent in fire resistance, has extremely small damages on a support wood material part, and is also excellent in strength. The present invention is directed to a multi-layered reinforced wood material A for use as a building material, the multi-layered reinforced wood material A including a support wood material part 1 for supporting load, a sheet part 3 attached to the periphery of the support wood material part 1, an inflammable wood material part 2 attached outside the sheet part 3 so as not to expose the sheet part 3, wherein the inflammable wood material part 1 is made of a wood material containing therein an inflammable agent, and the sheet part 3 is made of a fiber reinforced plastic.

16 Claims, 8 Drawing Sheets

(51) Int. Cl.
 *E04C 3/36* (2006.01)
 *B32B 21/08* (2006.01)
 *B32B 21/10* (2006.01)

(52) U.S. Cl.
 CPC .......... *E04C 3/36* (2013.01); *B32B 2260/021* (2013.01); *B32B 2307/3065* (2013.01); *B32B 2419/00* (2013.01)

(58) Field of Classification Search
 CPC . E04B 1/94; E04B 1/941; E04B 1/943; E04B 1/944; E04B 1/26; B27K 2240/30; E04C 3/14; E04C 3/36
 See application file for complete search history.

(56) References Cited

FOREIGN PATENT DOCUMENTS

| | | | |
|---|---|---|---|
| JP | 4292119 B2 | | 7/2009 |
| JP | 2010-216144 A | | 9/2010 |
| JP | 2015061969 A | * | 4/2015 |
| JP | 2016-30896 A | | 3/2016 |
| JP | 2017-75458 A | | 4/2017 |
| WO | WO-2016086290 A1 | * | 6/2016 ............... E04C 2/26 |

OTHER PUBLICATIONS

Translation of JP2015061969 (abstract and description). (Year: 2015).*
International Search Report of PCT/JP2018/038182 dated Nov. 6, 2018 and English translation thereof.

* cited by examiner

MULTI-LAYERED REINFORCED WOOD MATERIAL

TECHNICAL FIELD

The present invention relates to multi-layered reinforced wood materials and, in more detail, to a multi-layered reinforced wood material for use as a building material.

BACKGROUND ART

Many wooden buildings using wood materials for a main portion in view of structural resistance have been constructed.

Wooden buildings have humidity control properties, heat insulating properties, and so forth, and play a role of reducing environmental load because the wood materials themselves are recyclable.

However, wood materials have properties of being flammable and less resistant to fire.

Also, while wood materials are excellent in processability, they also have a drawback of poor strength.

Thus, in recent years, as building materials for use in wooden buildings, those having fire resistance and excellent in strength have been desired.

Note that, for example, known as a building material with fire resistance is a structure material including a load support layer formed of a wood material or the like sufficient to support long-term loading, a burning stop layer arranged outside the load support layer and having a high-heat-capacity material with a heat capacity larger than that of the wood material, and a burning margin layer arranged outside the burning stop layer and made of a wood material having a predetermined burning margin thickness (for example, refer to PTLs 1 to 3).

Since this structure material includes the burning margin layer as a portion to be lost at the time of a fire, the load support layer maintains strength over a predetermined period of time even if the burning margin layer is burning, thereby allowing the building to be prevented from collapsing.

CITATION LIST

Patent Literature

PTL 1: Japanese Patent Application Laid-Open No. 2005-36456
PTL 2: Japanese Patent No. 4065416
PTL 3: Japanese Patent No. 4292119

SUMMARY OF INVENTION

Technical Problem

However, in the structure materials described in the above-described PTLs 1 to 3, the structure is such that while fire resistance is provided, the burning margin layer burns. Therefore, at the time of burning of the burning margin layer, that fire may be transferred to another object.

Also, with the burning margin layer burning, heat is transmitted also to the load support layer (support wood material part). Thus, there is a high possibility that damages remain also in the load support layer.

Furthermore, it cannot be said that building materials formed of conventional wood materials including the structure materials described in the above-described PTLs 1 to 3 have sufficient strength.

The present invention was made in view of the above-described circumstances, and has an object of providing a multi-layered reinforced wood material in which fire resistance is excellent, damages on the support wood material part are extremely small even if a fire occurs nearby, and strength is also excellent.

Solution to Problems

As diligently conducting studies to solve the above-described problem, the inventor has found that the above-described problem can be solved by providing an inflammable wood material part outside a support wood material part and providing a fiber reinforced plastic between the support wood material part and the inflammable wood material part, leading to completion of the present invention.

The present invention resides in (1) a multi-layered reinforced wood material for use as a building material, including a support wood material part for supporting load, a sheet part attached to a periphery of the support wood material part, and an inflammable wood material part attached outside the sheet part so as not to expose the sheet part, wherein the inflammable wood material part is made of a wood material containing therein an inflammable agent, and the sheet part is made of a fiber reinforced plastic.

The present invention resides in (2) the multi-layered reinforced wood material described in the above-described (1), in which the support wood material part has a shape of a polygonal prism, the fiber reinforced plastic has a long shape, and the fiber reinforced plastic is laminated to each side surface of the support wood material part along a longitudinal direction of the side surface.

The present invention resides in (3) the multi-layered reinforced wood material described in the above-described (1) or (2), in which the sheet part has a thickness of 0.1 mm to 5 mm.

The present invention resides in (4) the multi-layered reinforced wood material described in any one of the above-described (1) to (3), in which the inflammable agent is a boron-based inflammable agent, and the fiber reinforced plastic is a carbon fiber reinforced plastic.

The present invention resides in (5) the multi-layered reinforced wood material described in any one of the above-described (1) to (4), in which the inflammable wood material part is formed by mutually coupling a plurality of laminated block materials containing therein the inflammable agent.

The present invention resides in (6) the multi-layered reinforced wood material described in any one of the above-described (1) to (4), in which the inflammable wood material part is formed of an inner inflammable wood material part attached outside the sheet part and an outer inflammable wood material part attached to a periphery of the inner inflammable wood material part, the inner inflammable wood material part and the outer inflammable wood material part are both formed by mutually coupling a plurality of laminated block materials containing therein the inflammable agent, a content of the inflammable agent in the inner inflammable wood material part is equal to or larger than 50 kg/m$^3$ and smaller than 200 kg/m$^3$, and a content of the inflammable agent in the outer inflammable wood material part is equal to or larger than 200 kg/m$^3$.

The present invention resides in (7) the multi-layered reinforced wood material described in the above-described (5) or (6), in which the laminated block materials each have a convex part or a concave part, and the convex part of one said laminated block material fits in the concave part of another said laminated block material.

The present invention resides in (8) the multi-layered reinforced wood material described in any one of the above-described (5) to (7), in which the laminated block materials are each formed by mutually laminating a plurality of plate-shaped wood materials.

The present invention resides in (9) the multi-layered reinforced wood material described in any one of the above-described (1) to (8) for use as a pillar or beam.

Advantageous Effects of Invention

The multi-layered reinforced wood material of the present invention includes the support wood material part for supporting load. Thus, structural resistance can be reliably maintained.

Also, in the multi-layered reinforced wood material, the inflammable wood material part made of the wood material containing therein the inflammable agent is further provided outside the sheet part so as not to expose the sheet part attached to the periphery of the support wood material part. Thus, it is possible to prevent the multi-layered reinforced wood material itself from burning (hereinafter also referred to as a "burning prevention effect").

This does not cause a situation in which a fire is transferred from the multi-layered reinforced wood material to another object, and also allows suppression of heat transfer to the support wood material part (hereinafter also referred to as a "heat transfer suppression effect"). Note that even if heat is accumulated in the inflammable wood material part, heat transfer to the support wood material part is interrupted by the sheet part, and thus the support wood material part is hardly damaged. That is, the support wood material part neither catches fire nor receives other external influences, and can maintain its initial state.

The multi-layered reinforced wood material of the present invention has the sheet part made of a fiber reinforced plastic provided between the support wood material part and the inflammable wood material part, and thus is excellent also in strength.

From these, the multi-layered reinforced wood material of the present invention is excellent in fire resistance, damages on the support wood material part are extremely small even if a fire occurs nearby, and strength is also excellent.

Here, in view of fire resistance and strength, the sheet part preferably has a thickness of 0.1 mm to 5 mm.

In the multi-layered reinforced wood material of the present invention, the above-described fiber reinforced plastic has a long shape, and is laminated to each side surface of the support wood material part along the longitudinal direction, thereby allowing an improvement in strength in the longitudinal direction of the multi-layered reinforced wood material. That is, the fiber reinforced plastic is excellent in strength and does not have stretching properties, and thus can suppress breaking and bending of the multi-layered reinforced wood material by an earthquake or the like.

In the multi-layered reinforced wood material of the present invention, when the inflammable wood material part is formed by mutually coupling the plurality of laminated block materials containing therein the inflammable agent, attachment of the inflammable wood material part to the support wood material part via the sheet part can be easily made.

In the multi-layered reinforced wood material of the present invention, when the inflammable wood material part is formed of the inner inflammable wood material part and the outer inflammable wood material part and the content of the inflammable agent in the inner inflammable wood material part is equal to or larger than 50 kg/m$^3$ and smaller than 200 kg/m$^3$ and the content of the inflammable agent in the outer inflammable wood material part is equal to or larger than 200 kg/m$^3$, the inner inflammable wood material part is more excellent in the heat transfer suppression effect than the outer inflammable wood material part, and the outer inflammable wood material part is more excellent in the burning prevention effect than the inner inflammable wood material part. Therefore, the multi-layered reinforced wood material including both can effectively exert the burning prevention effect and the heat transfer suppression effect.

Also, when the inner inflammable wood material part and the outer inflammable wood material part are both formed by mutually coupling the plurality of laminated block materials containing therein the inflammable agent, attachment of the inner inflammable wood material part to the support wood material part via the sheet part and attachment of the outer inflammable wood material part to the inner inflammable wood material part can be easily made.

In the multi-layered reinforced wood material of the present invention, in a mode in which the laminated block materials each have a convex part or a concave part at an end part and the convex part of one laminated block material fits in the concave part of another laminated block material, the laminated block materials can be firmly coupled.

In the multi-layered reinforced wood material of the present invention, when the laminated block materials are each formed by mutually laminating the plurality of plate-shaped wood materials, by adjusting the number of plate-shaped wood materials to be laminated, the thickness of the laminated block material can be freely adjusted.

Also, by laminating the plate-shaped wood materials as being shifted from one another, the convex part and concave part described above can be easily formed.

The multi-layered reinforced wood material of the present invention can be suitably used as a pillar or beam among building materials.

DESCRIPTION OF EMBODIMENTS

Figure 1A:
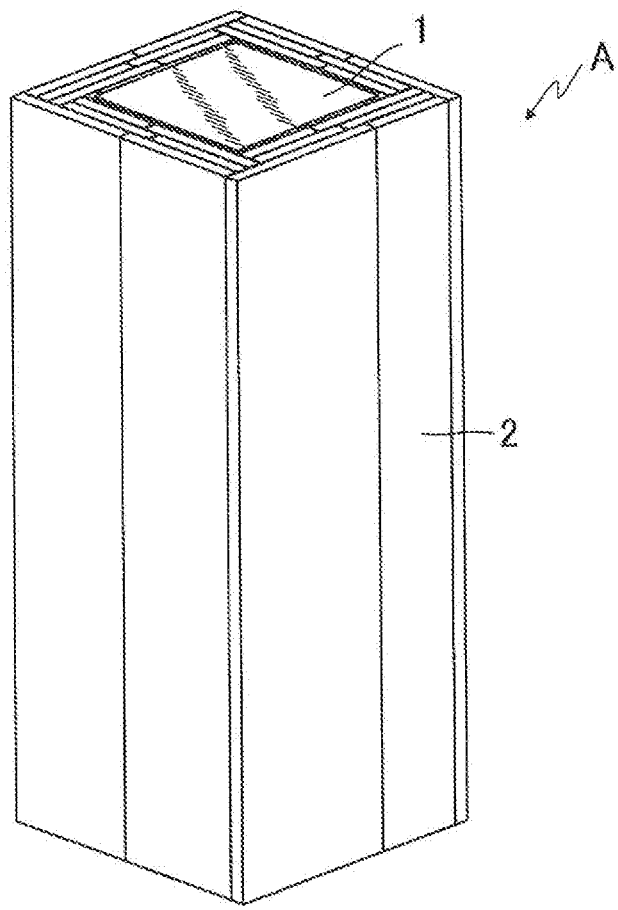
FIG. 1(a) is a perspective view depicting a first embodiment in which the multi-layered reinforced wood material according to the present invention is used as a pillar.

In the following, with reference to the drawings as required, suitable embodiments of the present invention are described in detail. Note in the drawings that the same components are provided with the same reference character and redundant description is omitted. Also, positional relations such as above, below, left, and right are based on the positional relations depicted in the drawings unless otherwise specified. Furthermore, the dimensional ratio in the drawings is not limited to the ratio in the drawings.

The multi-layered reinforced wood material according to the present invention is used as a building material. Specifically, it is suitably used as a pillar or beam.

First Embodiment

First, a first embodiment of the multi-layered reinforced wood material according to the present invention is described.

A multi-layered reinforced wood material A according to the first embodiment is an example having an outer appearance in the shape of a quadrangular prism and when used as a pillar.

Figure 1B:
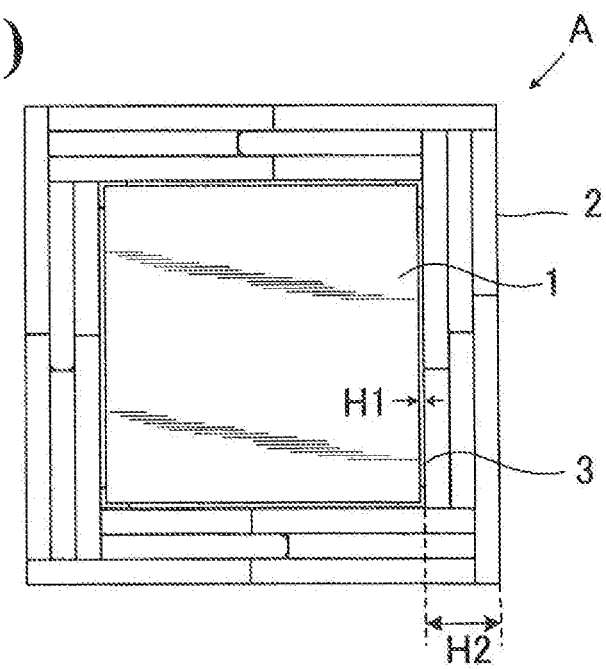
FIG. 1(b) is a horizontal sectional view thereof.

FIG. 1(a) is a perspective view depicting the first embodiment in which the multi-layered reinforced wood material according to the present invention is used as a pillar, and FIG. 1(b) is a horizontal sectional view thereof.

As depicted in FIG. 1(a) and FIG. 1(b), the multi-layered reinforced wood material A includes a support wood material part 1, which is a wood material for supporting load, a sheet part 3 attached to the periphery of the support wood material part 1, and an inflammable wood material part 2 attached outside the sheet part 3 so as not to expose the sheet part 3. That is, in the multi-layered reinforced wood material A, the periphery of the support wood material part 1 is covered with at least the inflammable wood material part 2.

Note that while the inflammable wood material part 2 is not provided to the upper surface and the lower surface of the multi-layered reinforced wood material A, the upper surface and the lower surface are bonded to other building materials such as beams, pillars, or floors (slabs) when the multi-layered reinforced wood material A is used as a pillar, and therefore, as a result, the upper surface and the lower surface of the multi-layered reinforced wood material A are not exposed.

Here, the "support wood material part" means a portion made of a wood material to support load.

Also, the "inflammable wood material part" means a portion made of a wood material containing therein an inflammable agent. Note that the inflammable wood material part 2 is made inflammable by the action of the inflammable agent.

In the multi-layered reinforced wood material A, the inflammable wood material part 2 is provided outside the sheet part 3 so as not to expose the sheet part 3 attached to the periphery of the support wood material part 1. Thus, it is possible to prevent the multi-layered reinforced wood material A itself from burning even if a fire occurs nearby.

This does not cause a situation in which a fire is transferred from the multi-layered reinforced wood material A to another object, and also allows suppression of heating the multi-layered reinforced wood material A to cause heat transfer to the support wood material part 1. Note that even if heat is accumulated in the inflammable wood material part 2, heat transfer to the support wood material part 1 is interrupted by the sheet part 3, and thus the support wood material part 1 is hardly damaged.

Also, in the multi-layered reinforced wood material A, as protected by the inflammable wood material part 2, the support wood material part 1 neither catches fire nor receives other external influences, and can maintain its initial state.

From these, the multi-layered reinforced wood material A according to the first embodiment is excellent in fire resistance, damages on the support wood material part are extremely small even if a fire occurs nearby, and strength is also excellent.

In the multi-layered reinforced wood material A, the support wood material part 1 is a wood material in the shape of a quadrangular prism serving as a core for supporting load.

The support wood material part 1 is designed so as to be safe alone with respect to load in view of structural resistance. That is, since the support wood material part 1 alone can support load, the structural resistance can be reliably maintained even if the inflammable wood material part 2 is removed.

Note that "load" means fixed load, live load, snow load, wind load, earthquake load, and load by earth pressure or hydraulic pressure defined in the Building Standards Act.

In the multi-layered reinforced wood material A, a wood material for use as the support wood material part 1 is not particularly restrictive, and general ones can be listed, such as red pine, cypress, larch, cedar, hiba, chestnut tree, hemlock, spruce, Alaska cedar, and Oregon pine.

Also, as the support wood material part 1, a so-called solid material, which is a wood material cut out from a log is adopted in view of interior humidity adjustment.

The sheet part 3 is attached between the support wood material part 1 and the inflammable wood material part 2, that is, to each side surface of the support wood material part 1. This extremely improves strength of the multi-layered reinforced wood material A.

The sheet part 3 has a flat sheet shape, and is attached to each side surface of the support wood material part 1 by being laminated thereto.

Here, the sheet part 3 preferably has a thickness H1 of 0.1 mm to 5 mm. If the thickness H1 is smaller than 0.1 mm, the strength improving effect may not be sufficiently acquired, compared with a case in which the thickness H1 is within the above-described range. If the thickness H1 exceeds 5 mm, compared with the case in which the thickness H1 is within the above-described range, weight increases, posing a drawback of deterioration of handling.

Figure 2:
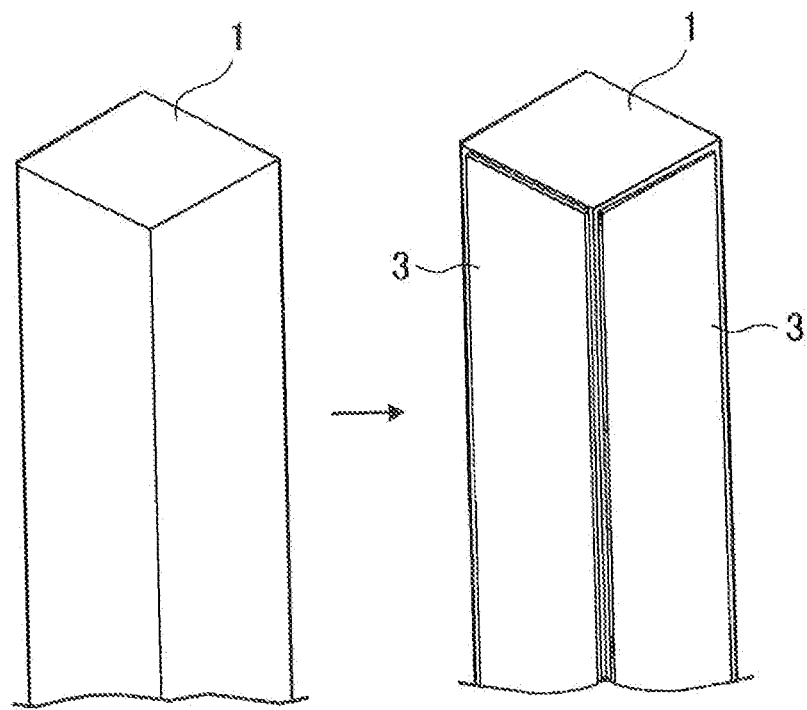
FIG. 2 is a perspective view depicting a state in which a sheet part is provided to a support wood material part in the multi-layered reinforced wood material according to the first embodiment.

FIG. 2 is a perspective view depicting a state in which the sheet part is provided to the support wood material part in the multi-layered reinforced wood material according to the first embodiment.

As depicted in FIG. 2, in the multi-layered reinforced wood material A, the sheet part 3 has a long shape, and thus is laminated to each side surface of the support wood material part 1 along the longitudinal direction (vertical direction) of the support wood material part 1. This allows an improvement in strength of the multi-layered reinforced wood material A in the longitudinal direction.

Note that a plurality of sheet parts 3 are laminated if each side surface of the support wood material part 1 is large. Here, a gap may be present between the sheet parts 3.

In the multi-layered reinforced wood material A, the occupation ratio of the sheet part 3 on each side surface of the support wood material part 1 is preferably equal to or larger than 80% and, more preferably, equal to or larger than 90%. This allows a sufficient improvement in strength to be recognized. Note that the occupation ratio is a value acquired by dividing the area of the surfaces of all sheet parts 3 laminated to the side surfaces of the support wood material part 1 by the area of the side surfaces of the support wood material part 1.

The sheet part 3 is made of a fiber reinforced plastic. That is, the fiber reinforced plastic is excellent in strength and does not have stretching properties, and thus can suppress breaking and bending of the multi-layered reinforced wood material A by an earthquake or the like.

Specifically, it is possible to list those made of a fiber such as glass fiber, carbon fiber, or resin fiber such as Kevlar, lignin, and Dyneema, and unsaturated polyester, epoxy resin, polyamide resin, phenol resin, or the like.

Among these, as the sheet part 3, a carbon fiber reinforced plastic (CFRP) is suitably used.

Referring back to FIG. 1(*b*), the inflammable wood material part 2 is attached outside the sheet part 3.

In multi-layered reinforced wood material A, when the inflammable wood material part 2 is attached to the sheet part 3, a bonding agent may be applied, or both may be fixed with a fixture such as a screw or nail. In this case, both can be more firmly coupled. Note that when no bonding agent is used or no fixture is used, it is possible to easily attach and detach the inflammable wood material part 2 to and from the sheet part 3.

Also, the inflammable wood material part 2 is formed by mutually coupling a plurality of laminated block materials.

Here, the inflammable wood material part 2 (laminated block materials) preferably has a thickness H2 of 20 mm to 200 mm in view of protecting the support wood material part 1 from heat. If the thickness H2 is smaller than 20 mm, heat may be transferred to the support wood material part 1 if a fire occurs nearby, compared with a case in which the thickness H2 is within the above-described range. If the thickness H2 exceeds 200 mm, compared with the case in which the thickness H2 is within the above-described range, weight increases, posing drawbacks of deterioration in operability and an increase in cost.

Figure 3:
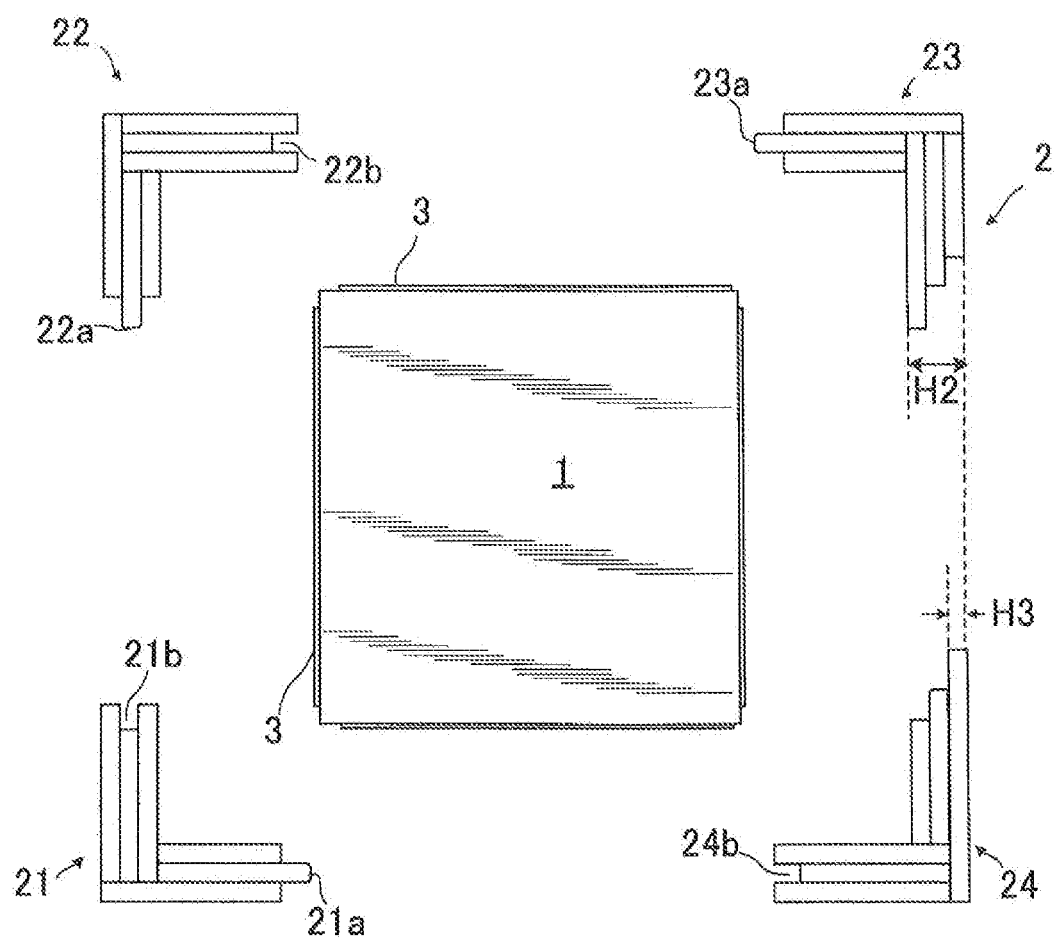
FIG. 3 is a horizontal sectional view depicting the support wood material part and the sheet part and disassembled laminated block materials of an inflammable wood material part in the multi-layered reinforced wood material according to the first embodiment.

FIG. 3 is a horizontal sectional view depicting the support wood material part and the sheet part and disassembled laminated block materials of the inflammable wood material part in the multi-layered reinforced wood material according to the first embodiment.

As depicted in FIG. 3, the inflammable wood material part 2 in the shape of a hollow quadrangular prism can be separated, at a portion near a substantially intermediate point of each side surface of the support wood material part 1, into four laminated block materials 21, 22, 23, and 24 each having a corner part and an L shape when viewed from top. That is, the inflammable wood material part 2 is formed by mutually coupling the laminated block materials 21, 22, 23, and 24. This allows easy attachment of the inflammable wood material part 2 to the support wood material part 1 via the sheet part 3 in the multi-layered reinforced wood material A.

Note that in the following, for the purpose of convenience, a lower-left laminated block material depicted in FIG. 3 is also referred to as the first laminated block material 21, an upper-left laminated block material is also referred to as the second laminated block material 22, an upper-right laminated block material is also referred to as the third laminated block material 23, and a lower-right laminated block material is also referred to as the fourth laminated block material 24.

In the inflammable wood material part 2, the first laminated block material 21 has a convex part 21*a* at an end part on a fourth laminated block material 24 side, and has a concave part 21*b* at an end part on a second laminated block material 22 side. Also, the second laminated block material 22 has a convex part 22*a* at an end part on a first laminated block material 21 side, and has a concave part 22*b* at an end part on a third laminated block material 23 side. Furthermore, the third laminated block material 23 has a convex part 23*a* at an end part on a second laminated block material 22 side, and has an end part in the shape of steps on a fourth laminated block material 24 side. Still further, the fourth laminated block material 24 has a concave part 24*b* at an end part on a first laminated block material 21 side, and has an end part in the shape of steps on a third laminated block material 23 side.

And, the convex part 21*a* of the first laminated block material 21 can fit in the concave part 24*b* of the fourth laminated block material 24. Also, the convex part 22*a* of the second laminated block material 22 can fit in the concave part 21*b* of the first laminated block material 21. Furthermore, the convex part 23*a* of the third laminated block material 23 can fit in the concave part 22*b* of the second laminated block material 22. Note that the mutual fitting-in relation among these is preferably an interference fit.

Furthermore, the stepped end part of the third laminated block material 23 and the stepped end part of the fourth laminated block material 24 are oppositely oriented, and abutting makes their shapes match.

Therefore, in the multi-layered reinforced wood material A, with the stepped end part of the third laminated block material 23 and the stepped end part of the fourth laminated block material 24 facing and abutting on each other and the corresponding convex part and concave part of the laminated block materials 21, 22, 23, and 24 fitting in each other, the inflammable wood material part 2 is formed outside the support wood material part 1.

In this manner, the inflammable wood material part 2 couples the laminated block materials 21, 22, 23, and 24 fitting by using the convex parts and the concave parts. Thus, they are not detached unintentionally, and their coupling can be made firm.

Also, when the convex part fits in the concave part and when the stepped end parts abut on each other, a bonding agent may be applied, or both may be fixed with a fixture such as a screw or nail. In this case, both can be more firmly coupled. Note that when no bonding agent is used or no fixture is used, it is possible to easily attach and detach the laminated block materials from each other.

Each of the laminated block materials 21, 22, 23, and 24 contains an inflammable agent, and is formed of a plurality of plate-shaped wood materials mutually laminated. This allows the inflammable wood material part 2 to have sufficient strength and to be reliably made inflammable.

In the multi-layered reinforced wood material A, a wood material for use as the plate-shaped wood material is not particularly restrictive, and any of general ones can be used as appropriate, such as solid materials, laminated veneer lumber (LVL), plywood, plate-shaped butcher blocks, and so forth of red pine, cypress, larch, cedar, hiba, chestnut tree, hemlock, spruce, Alaska cedar, Oregon pine, and so forth.

Also, in view of ease of handling and ease of manufacture, the plate-shaped wood material preferably has a thickness H3 of 5 mm to 50 mm.

In the multi-layered reinforced wood material A, as the inflammable agent described above, listed are as follows: a boron-based inflammable agent having a boron-based compound as a main component, such as boric acid, sodium borate, potassium borate, or ammonium borate; a phosphorus-based inflammable agent having a phosphorus-based compound as a main component, such as ammonium phosphate or guanidine phosphate; a nitrogen-based inflammable agent; a halogen-based inflammable agent having a halogen-based compound as a main component, such as ammonium bromide; a silicon-based inflammable agent having a silicon compound as a main component; and so forth.

Among these, in view of excellent safety at the time of handling, small environmental load, and sufficient acquisition of an inflammable effect, the inflammable agent is preferably a boron-based inflammable agent. Note that in the boron-based inflammable agent, the solid compound of the contained boron-based compound is preferably at least equal to or larger than 10% by mass.

A method of making the laminated block material contain the inflammable agent is not particularly restrictive. For example, listed are as follows: a spray method in which an inflammable liquid with the inflammable agent dissolved or dispersed into a medium such as water is fabricated and the inflammable liquid is sprayed to the plate-shaped wood materials before lamination or to the laminated block materials after the plate-shaped wood materials are laminated; an immersion method in which the dried plate-shaped wood materials or the dried laminated block materials are immersed into the inflammable liquid for application of the inflammable agent.

Also, when the inflammable liquid is applied to the plate-shaped wood materials or the laminated block materials or after application, a heating/cooling process or a compression/decompression process may be performed to make the inflammable liquid more uniformly penetrate.

Note that as the inflammable liquid, for example, the inflammable process liquid described in Japanese Patent No. 3485914 can also be adopted.

The plate-shaped wood materials are mutually bonded with a bonding agent.

This bonding agent is not particularly restrictive, and a known one such as a resorcinol resin bonding agent can be used as appropriate. Note that this case is not meant to be restrictive and the same goes for the bonding agent described above.

Each of the laminated block materials 21, 22, 23, and 24 can be acquired by bonding a first laminated body, which is formed by bonding, surface to surface, plate-shaped wood materials having different lengths in a width direction so that one end of each of them aligns, to an end part of (another) plate-shaped wood material forming a corner part so as to form a right angle; and bonding a second laminated body, which is formed by bonding, surface to surface, plate-shaped wood materials having different lengths in the width direction so that one end of each of them aligns, to a side surface of the first laminated body so as to form a right angle and bonding, surface to surface, the second laminated body to the plate-shaped wood material forming the corner part.

Note that in the multi-layered reinforced wood material A according to the first embodiment, three plate-shaped wood materials are laminated as the first laminated body and two plate-shaped wood materials are laminated as the second laminated body.

In this manner, in the laminated block materials 21, 22, 23, and 24 forming the inflammable wood material part 2, the plate-shaped wood materials having different lengths in the width direction are used. Thus, the end parts of the laminated block materials can be easily stepped.

Also, by making the center plate-shaped wood material protrude, a convex part can be formed at an end part of the laminated block material. Conversely, by making the front and back plate-shaped wood materials protrude, a concave part can be formed at an end part of the laminated block material.

Figure 4:
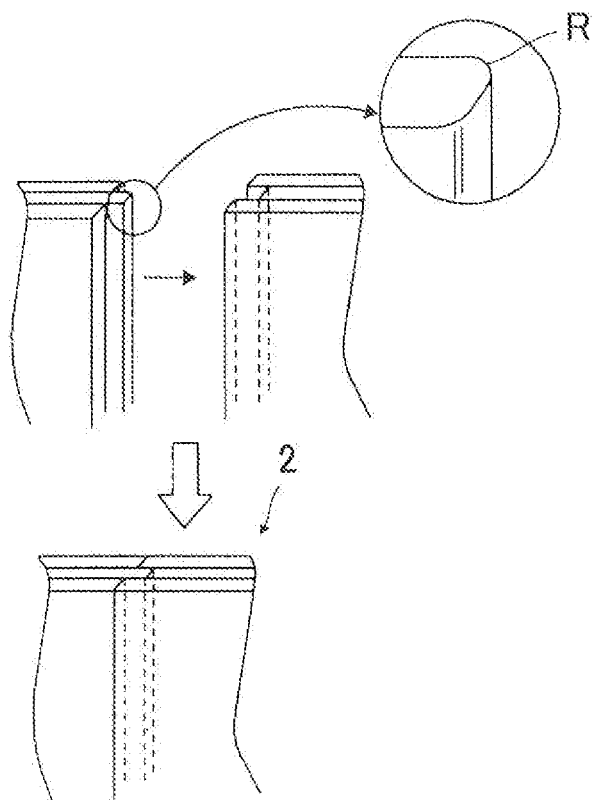
FIG. 4 is a perspective view schematically depicting a state in which a convex part of one laminated block material fits in a concave part of another laminated block material in the multi-layered reinforced wood material according to the first embodiment.

FIG. 4 is a perspective view schematically depicting a state in which a convex part of one laminated block material fits in a concave part of another laminated block material in the multi-layered reinforced wood material according to the first embodiment.

As depicted in FIG. 4, in the inflammable wood material part 2, the convex part extending in the vertical direction formed by making the center plate-shaped wood material of one laminated block material protrude is strongly press-fitted into the concave part extending in the vertical direction formed by making the front and back plate-shaped wood materials of another laminated block material protrude, thereby coupling the laminated block materials together.

Here, in the plate-shaped wood material forming the convex part, for ease of fitting into the concave part, roundness R is preferably provided to each of corner parts on both sides of the convex part. Note that such roundness R is provided in advance to the plate-shaped wood material where the convex part is to be formed when the laminated block material is fabricated. Also, here, as described above, the use of a bonding agent allows firm coupling, and no use of a bonding agent allows attachability and detachability.

Second Embodiment

Next, a second embodiment of the multi-layered reinforced wood material according to the present invention is described.

A multi-layered reinforced wood material B according to the second embodiment is an example having an outer appearance in the shape of a quadrangular prism and, as with the multi-layered reinforced wood material A according to the first embodiment described above, when used as a pillar.

Figure 5:
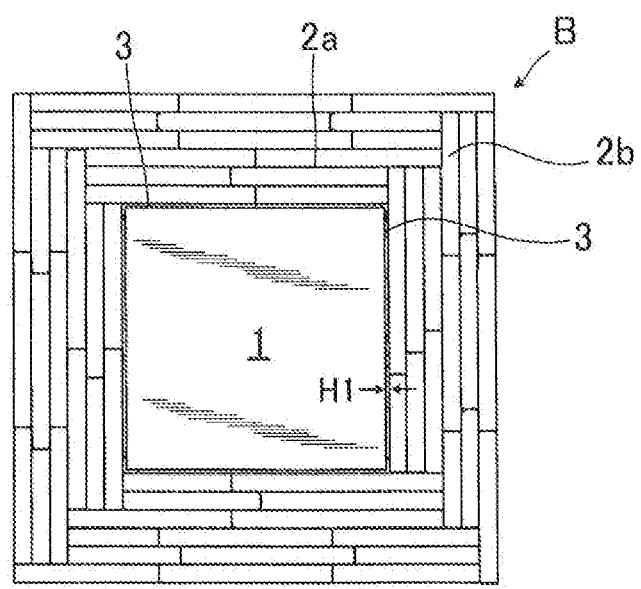
FIG. 5 is a horizontal sectional view depicting a second embodiment in which the multi-layered reinforced wood material according to the present invention is used as a pillar.

FIG. 5 is a horizontal sectional view depicting the second embodiment in which the multi-layered reinforced wood material according to the present invention is used as a pillar.

As depicted in FIG. 5, the multi-layered reinforced wood material B includes the support wood material part 1, which is a wood material for supporting load, the sheet part 3 attached to the periphery of the support wood material part 1, and an inner inflammable wood material part 2a attached outside the sheet part 3 and an outer inflammable wood material part 2b attached to the periphery of the inner inflammable wood material part 2a so as not to expose the sheet part 3.

That is, the multi-layered reinforced wood material B according to the second embodiment is identical to the multi-layered reinforced wood material A according to the first embodiment except that the inflammable wood material part 2 is formed of the inner inflammable wood material part 2a and the outer inflammable wood material part 2b.

In the multi-layered reinforced wood material B, the inner inflammable wood material part 2a and the outer inflammable wood material part 2b are provided outside the sheet part 3 so as not to expose the sheet part 3 attached to the periphery of the support wood material part 1. Thus, it is possible to more prevent the multi-layered reinforced wood material B itself from burning even if a fire occurs nearby. This does not cause a situation in which a fire is transferred from the multi-layered reinforced wood material B to another object, and also allows suppression of heating the multi-layered reinforced wood material B to cause heat transfer to the support wood material part 1. Note that even if heat is accumulated in the inner inflammable wood material part 2a and the outer inflammable wood material part 2b, heat transfer to the support wood material part 1 is interrupted by the sheet part 3, and thus the support wood material part 1 is hardly damaged.

Also in the multi-layered reinforced wood material B, as protected by the inner inflammable wood material part 2a and the outer inflammable wood material part 2b, the support wood material part 1 neither catches fire nor receives other external influences, and can maintain its initial state.

From these, the multi-layered reinforced wood material B according to the second embodiment is excellent in fire resistance, damages on the support wood material part are extremely small even if a fire occurs nearby, and strength is also excellent.

In the multi-layered reinforced wood material B, the inner inflammable wood material part 2a and the outer inflammable wood material part 2b each in the shape of a hollow quadrangular prism are each formed by mutually coupling a plurality of laminated block materials containing therein an inflammable agent. This allows easy attachment of the inner inflammable wood material part 2a to the support wood material part 1 via the sheet part 3 and easy attachment of the outer inflammable wood material part 2b to the inner inflammable wood material part 2a in the multi-layered reinforced wood material B.

In the multi-layered reinforced wood material B, it is preferable that the content of the inflammable agent in the inner inflammable wood material part 2a be equal to or larger than 50 kg/m$^3$ and smaller than 200 kg/m$^3$ and the content of the inflammable agent in the outer inflammable wood material part 2b part be equal to or larger than 200 kg/m$^3$.

In this case, the inner inflammable wood material part 2a having a small content of the inflammable agent is more excellent in the heat transfer suppression effect than the outer inflammable wood material part 2b, and the outer inflammable wood material part 2b having a large content of the inflammable agent is more excellent in the burning prevention effect than the inner inflammable wood material part 2a.

Therefore, the multi-layered reinforced wood material B including both can effectively exert the burning prevention effect and the heat transfer suppression effect.

Third Embodiment

Next, a third embodiment of the multi-layered reinforced wood material according to the present invention is described.

A multi-layered reinforced wood material C according to the third embodiment is an example having an outer appearance in the shape of a quadrangular prism and when used as a beam.

Figure 6:
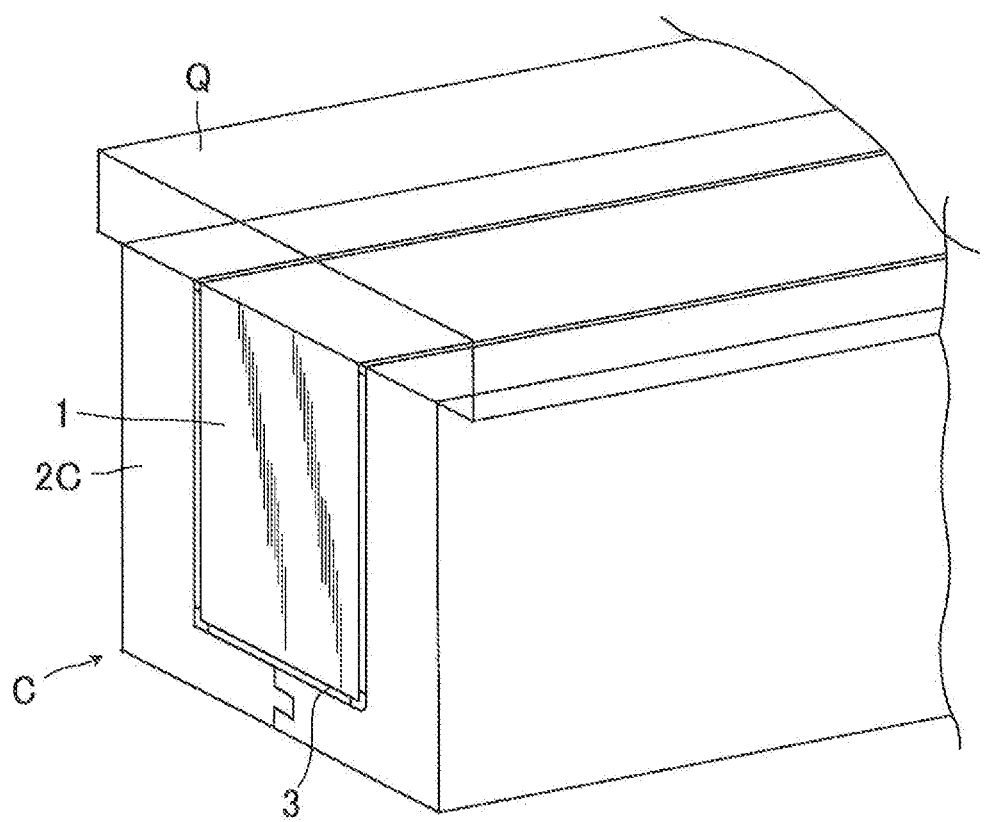
FIG. 6 is a partially transparent perspective view depicting a third embodiment in which the multi-layered reinforced wood material according to the present invention is used as a beam.

FIG. 6 is a partially transparent perspective view depicting the third embodiment in which the multi-layered reinforced wood material according to the present invention is used as a beam. Note in FIG. 6 that only the outline of the laminated block material is depicted.

As depicted in FIG. 6, the multi-layered reinforced wood material C includes the support wood material part 1, which is a wood material for supporting load, the sheet part 3 attached to the side surfaces and the lower surface of the periphery of the support wood material part 1, and an inflammable wood material part 2c attached outside the sheet part 3 so as not to expose the sheet part 3. That is, in the multi-layered reinforced wood material C, the side surfaces and the lower surface of the support wood material part 1 is covered with at least the inflammable wood material part 2c.

Note that while the inflammable wood material part 2c is not provided to the upper surface and the end faces (surfaces parallel to a cross section) of the multi-layered reinforced wood material C, the upper surface is bonded to another building material such as a floor (slab) Q and the left and right side surfaces are each bonded to a beam (small beam), a pillar, or another building material when the multi-layered reinforced wood material C is used as a beam and, therefore, as a result, the upper surface and the end faces on both sides of the multi-layered reinforced wood material C are not exposed.

In the multi-layered reinforced wood material C, the inflammable wood material part 2c is provided outside the sheet part 3 so as not to expose the sheet part 3 attached to the side surfaces and the lower surface of the support wood material part 1. Thus, it is possible to prevent the multi-layered reinforced wood material C itself from burning even if a fire occurs nearby. This does not cause a situation in which a fire is transferred from the multi-layered reinforced wood material C to another object, and also allows suppression of heating the multi-layered reinforced wood material C to cause heat transfer to the support wood material part 1. Note that even if heat is accumulated in the inflammable wood material part 2c, heat transfer to the support wood material part 1 is interrupted by the sheet part 3, and thus the support wood material part 1 is hardly damaged.

Also, in the multi-layered reinforced wood material C, as protected by the inflammable wood material part 2c, the support wood material part 1 neither catches fire nor receives other external influences, and can maintain its initial state.

From these, the multi-layered reinforced wood material C according to the third embodiment is excellent in fire resistance, damages on the support wood material part are extremely small even if a fire occurs nearby, and strength is also excellent.

While the suitable embodiments of the present invention have been described in the foregoing, the present invention is not limited to the above-described embodiments.

In the multi-layered reinforced wood materials A to C according to the first to third embodiments, the support wood material part 1 is a wood material in the shape of a quadrangular prism, but is not limited to this if it can support load. That is, the support wood material part 1 may have a shape of a polygonal prism such as a triangular prism, pentagonal prism, or hexagonal prism, or may have a circular cylindrical shape.

Also, while the inflammable wood materials 2, 2a, and 2b are each in the shape of a hollow quadrangular prism, this is not meant to be restrictive as long as arrangement is possible so that the periphery of the support wood material part 1 is not exposed.

In the multi-layered reinforced wood materials A to C according to the first to third embodiments, a solid material is adopted as the support wood material part 1. However, this may be formed of plywood, laminated veneer lumber (LVL), a butcher block, or the like.

In the multi-layered reinforced wood materials A to C according to the first to third embodiments, the sheet part 3 (fiber reinforced plastic) is laminated to each side surface of the support wood material part 1 along the longitudinal direction of the side surface. However, this is not meant to be restrictive.

For example, the sheet part 3 may be helically provided or may be provided in a ring shape to the support wood material part 1.

In the multi-layered reinforced wood materials A to C according to the first to third embodiments, the number of laminated block materials to form the inflammable wood material part is not particularly restrictive.

FIG. 7(a) to FIG. 7(d) are horizontal sectional views depicting examples with different numbers of laminated block materials configuring an inflammable wood material part in multi-layered reinforced wood materials according to other embodiments. Note in FIG. 7(a) to FIG. 7(d) that only the outline of each laminated block material is depicted.

Figure 7A:
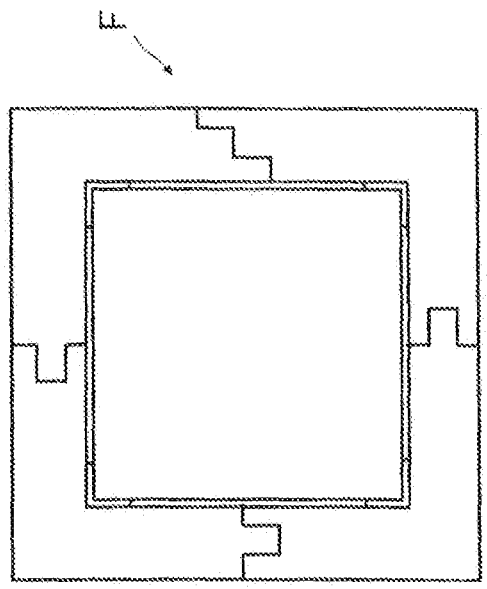
FIG. 7(a) to FIG. 7(d) are horizontal sectional views depicting examples with different numbers of laminated block materials configuring an inflammable wood material part in multi-layered reinforced wood materials according to other embodiments.
Figure 7D:
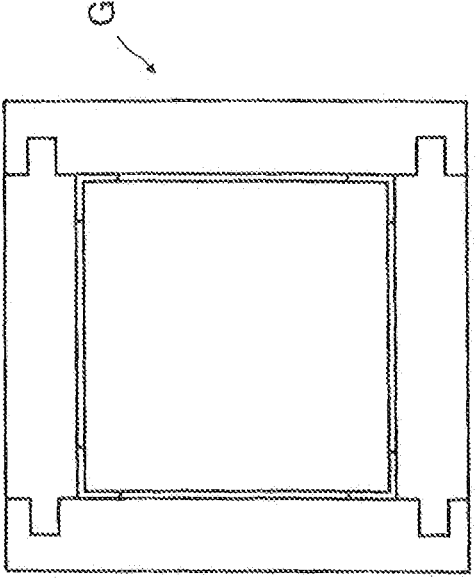
Figure 7B:
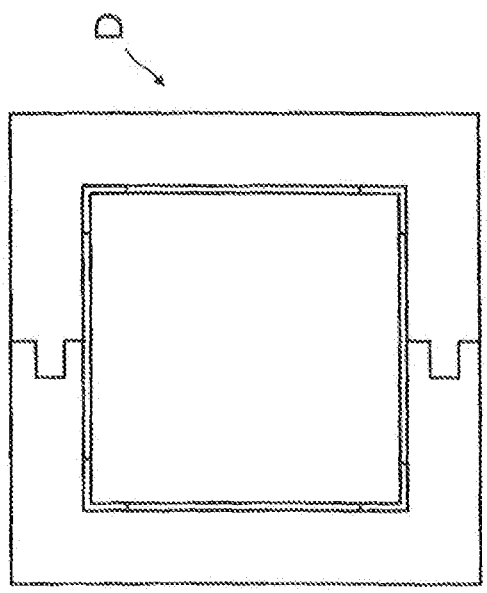

A multi-layered reinforced wood material D depicted in FIG. 7(a) has an inflammable wood material part formed of two laminated block materials, and a multi-layered reinforced wood material E depicted in FIG. 7(b) has an inflammable wood material part formed of three laminated block materials.

Figure 7C:
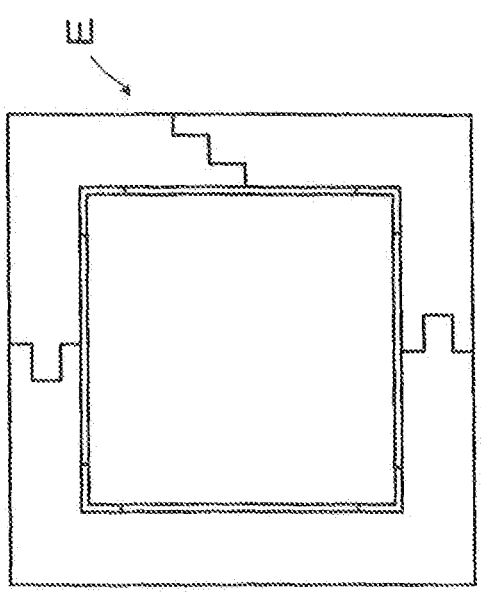
Figure 8A:
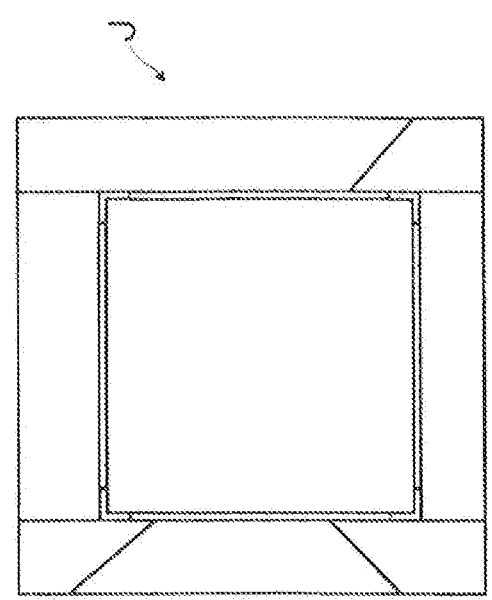
FIG. 8(a) to FIG. 8(d) are horizontal sectional views depicting examples with different shapes of end parts of laminated block materials in multi-layered reinforced wood materials according to other embodiments.
Figure 8C:
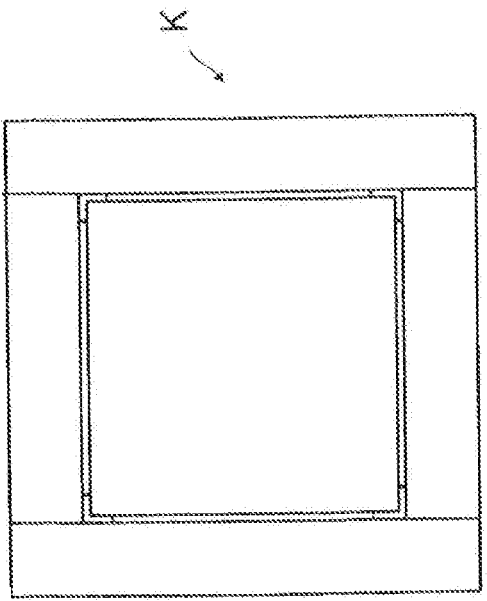
Figure 8B:
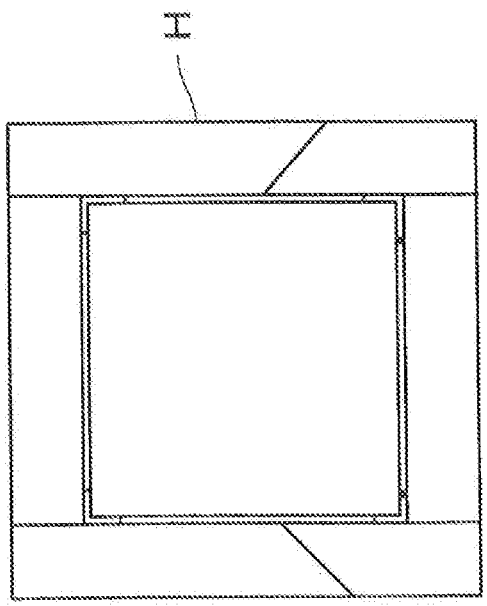
Figure 8D:
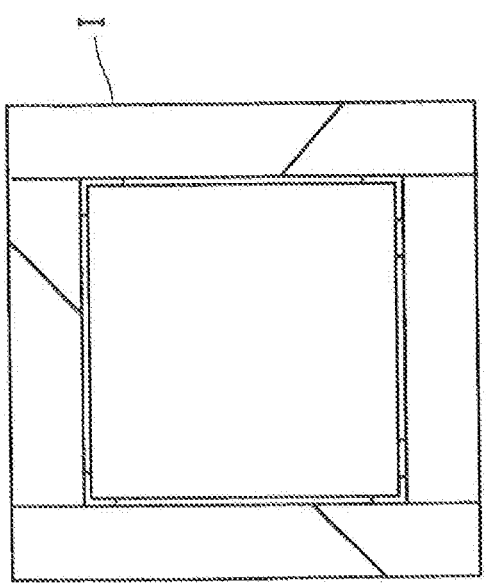

Multi-layered reinforced wood materials F and G depicted in FIG. 7(c) and FIG. 7(d) each have an inflammable wood material part formed of four laminated block materials, but have different shapes of a portion where both are mutually coupled.

In this manner, the number of laminated block materials into which the inflammable wood material part is divided can be adjusted as appropriate.

Note that while these multi-layered reinforced wood materials D, E, F, and G have laminated block materials coupled, one piece of a solid material, laminated veneer lumber (LVL), plywood, or the like may be used in place of the laminated block materials.

In the multi-layered reinforced wood materials A and B according to the first and second embodiments, while the laminated block material is formed of a plurality of plate-shaped wood materials mutually laminated, the number of plate-shaped wood materials to be laminated is not particularly restrictive.

Also, here, while the plate-shaped wood materials having different lengths in the width direction are adopted, those having the same length in the width direction may be included, and those all having the same length in the width direction may be used.

In the multi-layered reinforced wood materials A and B according to the first and second embodiments, while the concave part, the convex part, the stepped portion, or the like is provided to the side surface at the end part of each laminated block material for mutual coupling, they are not necessarily requisites.

FIG. 8(a) to FIG. 8(d) are horizontal sectional views depicting examples with different shapes of end parts of laminated block materials in multi-layered reinforced wood materials according to other embodiments. Note in FIG. 8(a) to FIG. 8(d) that only the outline of each laminated block material is depicted.

As depicted in FIG. 8(a) to FIG. 8(d), in multi-layered reinforced wood materials H, I, J, and K, by forming the side surface at the end part of each of the laminated block materials as a flat surface and mutually bonding these surfaces, the laminated block materials can be coupled to each other.

Note that while these multi-layered reinforced wood materials H, I, J, and K have laminated block materials coupled, one piece of a solid material, laminated veneer lumber (LVL), plywood, or the like may be used in place of the laminated block materials.

In the multi-layered reinforced wood materials A and B according to the first and second embodiments, the inflammable wood material part is formed of the plurality of laminated block materials containing the inflammable agent. However, any of a solid material, laminated veneer lumber (LVL), plywood, or the like containing the inflammable agent can also be adopted.

In the multi-layered reinforced wood material according to the present invention, its outer surface may be subjected to so-called finishing process. For example, as an outer sheath, known coating may be applied, or a known sheet, sliced veneer, or decorative board may be laminated. In this case, precipitation of the inflammable agent can be suppressed, and durability of the multi-layered reinforced wood material is also improved.

INDUSTRIAL APPLICABILITY

The multi-layered reinforced wood material according to the present invention is suitably used as a building material of a skeletal framework of an architecture, for example, a pillar or beam.

According to the multi-layered reinforced wood material of the present invention, fire resistance is excellent, damages on the support wood material part are extremely small even if a fire occurs nearby, and strength is also excellent.

REFERENCE SIGNS LIST

1 . . . support wood material part
2, 2c . . . inflammable wood material part
21 . . . first laminated block material (laminated block material)
21a, 22a, 23a . . . convex part
21b, 22b, 24a . . . concave part
22 . . . second laminated block material (laminated block material)
23 . . . third laminated block material (laminated block material)
24 . . . fourth laminated block material (laminated block material)
2a . . . inner inflammable wood material part (inflammable wood material part)
2b . . . outer inflammable wood material part (inflammable wood material part)
3 . . . sheet part
A, B, C, D, E, F, G, H, I, J, K . . . multi-layered reinforced wood material
H1, H2, H3 . . . thickness

The invention claimed is:

1. A multi-layered reinforced wood material for use as a building material, comprising:
   a support wood material part for supporting load;
   a sheet part attached to a periphery of the support wood material part; and
   an inflammable wood material part attached outside the sheet part so as not to expose the sheet part, wherein the inflammable wood material part is made of a wood material containing therein an inflammable agent, the sheet part is made of a fiber reinforced plastic,
the inflammable wood material part is formed of an inner inflammable wood material part attached outside the sheet part and an outer inflammable wood material part attached to a periphery of the inner inflammable wood material part,
the inner inflammable wood material part and the outer inflammable wood material part are both formed by mutually coupling a plurality of laminated block materials containing therein the inflammable agent,
a content of the inflammable agent in the inner inflammable wood material part is equal to or larger than 50 kg/m$^3$ and smaller than 200 kg/m$^3$,
a content of the inflammable agent in the outer inflammable wood material part is equal to or larger than 200 kg/m$^3$, and
the sheet part has a thickness of 0.1 mm to 5 mm.

2. The multi-layered reinforced wood material according to claim 1, wherein
the support wood material part has a shape of a polygonal prism,
the fiber reinforced plastic has a long shape, and
the fiber reinforced plastic is laminated to each side surface of the support wood material part along a longitudinal direction of the side surface.

3. The multi-layered reinforced wood material according to claim 1, wherein
the inflammable agent is a boron-based inflammable agent, and
the fiber reinforced plastic is a carbon fiber reinforced plastic.

4. The multi-layered reinforced wood material according to claim 1 for use as a pillar or beam.

5. The multi-layered reinforced wood material according to claim 1, wherein
the laminated block materials each have a convex part or a concave part, and
the convex part of one said laminated block material fits in the concave part of another said laminated block material.

6. The multi-layered reinforced wood material according to claim 1, wherein
the laminated block materials are each formed by mutually laminating a plurality of plate-shaped wood materials.

7. The multi-layered reinforced wood material according to claim 5, wherein
the laminated block materials are each formed by mutually laminating a plurality of plate-shaped wood materials.

8. A multi-layered reinforced wood material for use as a building material, comprising:
a support wood material part for supporting load;
a sheet part attached to a periphery of the support wood material part; and
an inflammable wood material part attached outside the sheet part so as not to expose the sheet part, wherein
the inflammable wood material part is made of a wood material containing therein an inflammable agent,
the sheet part is made of a fiber reinforced plastic,
the inflammable wood material part is formed by mutually coupling a plurality of laminated block materials containing therein the inflammable agent,
the laminated block materials each have a convex part or a concave part,
the convex part of one said laminated block material fits in the concave part of another said laminated block material, and
the sheet part has a thickness of 0.1 mm to 5 mm.

9. The multi-layered reinforced wood material according to claim 8, wherein
the laminated block materials are each formed by mutually laminating a plurality of plate-shaped wood materials.

10. The multi-layered reinforced wood material according to claim 8, wherein
the support wood material part has a shape of a polygonal prism,
the fiber reinforced plastic has a long shape, and
the fiber reinforced plastic is laminated to each side surface of the support wood material part along a longitudinal direction of the side surface.

11. The multi-layered reinforced wood material according to claim 8, wherein
the inflammable agent is a boron-based inflammable agent, and
the fiber reinforced plastic is a carbon fiber reinforced plastic.

12. The multi-layered reinforced wood material according to claim 8 for use as a pillar or beam.

13. A multi layered reinforced wood material for use as a building material, comprising:
a support wood material part for supporting load;
a sheet part attached to a periphery of the support wood material part; and
an inflammable wood material part attached outside the sheet part so as not to expose the sheet part, wherein
the inflammable wood material part is made of a wood material containing therein an inflammable agent,
the sheet part is made of a fiber reinforced plastic,
the inflammable wood material part is formed by mutually coupling a plurality of laminated block materials containing therein the inflammable agent,
the laminated block materials are each formed by mutually laminating a plurality of plate-shaped wood materials, and
the sheet part has a thickness of 0.1 mm to 5 mm.

14. The multi-layered reinforced wood material according to claim 13, wherein
the support wood material part has a shape of a polygonal prism,
the fiber reinforced plastic has a long shape, and
the fiber reinforced plastic is laminated to each side surface of the support wood material part along a longitudinal direction of the side surface.

15. The multi-layered reinforced wood material according to claim 13, wherein
the inflammable agent is a boron-based inflammable agent, and
the fiber reinforced plastic is a carbon fiber reinforced plastic.

16. The multi-layered reinforced wood material according to claim 13 for use as a pillar or beam.

\* \* \* \* \*